United States Patent
Nagai et al.

(10) Patent No.: US 9,605,609 B2
(45) Date of Patent: Mar. 28, 2017

(54) CONTROL APPARATUS FOR VEHICLE (71) Applicant: TOYOTA JIDOSHA KABUSHIKI KAISHA, Toyota-shi (JP)

(72) Inventors: Tadayuki Nagai, Susono (JP); Masami Kondo, Niwa-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 142 days.

(21) Appl. No.: 14/739,123

(22) Filed: Jun. 15, 2015

(65) Prior Publication Data
US 2015/0361906 A1 Dec. 17, 2015

(30) Foreign Application Priority Data

Jun. 17, 2014 (JP) .................................. 2014-124803

(51) Int. Cl.
*F02D 41/00* (2006.01)
*F02B 37/12* (2006.01)
(Continued)

(52) U.S. Cl.
CPC .......... *F02D 41/0007* (2013.01); *F02B 37/18* (2013.01); *F02D 41/023* (2013.01);
(Continued)

(58) Field of Classification Search
CPC .... F02D 41/0007; F02D 41/023; F02D 41/10; F02D 41/1475; F02D 2250/21;
(Continued)

(56) References Cited

U.S. PATENT DOCUMENTS 5,109,826 A * 5/1992 Kato ..................... B60W 10/06
123/564
5,213,186 A * 5/1993 Murata ................. F16H 61/143
192/3.33
(Continued)

FOREIGN PATENT DOCUMENTS

JP 61-104128 A 5/1986
JP 04-187820 7/1992
(Continued)

OTHER PUBLICATIONS

Office Action issued Nov. 4, 2015 in Japanese Patent Application No. 2014-124803 (submitting English language translation only).
(Continued)

*Primary Examiner* — Thomas Moulis
*Assistant Examiner* — Susan Scharpf
(74) *Attorney, Agent, or Firm* — Oblon, McClelland, Maier & Neustadt, L.L.P.

(57) ABSTRACT

A control apparatus for a vehicle, wherein the vehicle includes an engine having a turbocharger and an automatic transmission. The control apparatus includes at least one electronic control unit configured to: control an air-fuel ratio of the engine and an operating state of the turbocharger based on a parameter indicating a load of the engine; control the turbocharger to execute turbocharging and operate the engine in a turbocharging lean combustion mode when the parameter is within a predetermined range, an air-fuel ratio set in the turbocharging lean combustion mode being a predetermined lean air-fuel ratio; and operate the engine in a predetermined operation mode instead of the turbocharging lean combustion mode in at least a part of the predetermined range when a downshift is performed in the automatic transmission, an air-fuel ratio set in the predetermined
(Continued)

operation mode being a richer air-fuel ratio than the predetermined lean air-fuel ratio.

4 Claims, 6 Drawing Sheets

(51) Int. Cl.
*F02D 41/02* (2006.01)
*F02D 41/10* (2006.01)
*F02D 41/14* (2006.01)
*F02B 37/18* (2006.01)

(52) U.S. Cl.
CPC ......... *F02D 41/10* (2013.01); *F02D 41/1475* (2013.01); *F02D 2250/21* (2013.01); *Y02T 10/144* (2013.01)

(58) Field of Classification Search
CPC ............. F02D 2250/32; F02D 41/0057; F02D 41/3017; F02D 41/0215; F02D 41/0225; F02D 2700/02; F02D 2700/0205; F02D 2700/0207; F02D 2700/0212; F02D 2700/0215; F02D 2700/022; F02D 2700/0225; F02D 2700/0246; F02D 2700/0258; F02D 2700/0279; F02D 2700/0287; F02D 2700/0294; F02D 41/021; F02B 37/18; Y02T 10/144
USPC ........................ 701/103; 123/568.11, 568.12
See application file for complete search history.

(56) References Cited

U.S. PATENT DOCUMENTS

| | | | | |
|---|---|---|---|---|
| 5,226,351 A * | 7/1993 | Matsuoka | ........... | F16H 61/0213 477/121 |
| 6,327,856 B1 * | 12/2001 | Iwabuchi | ................. | F02B 1/12 60/602 |
| 7,736,268 B2 * | 6/2010 | Tanaka | .................... | F16H 59/24 477/125 |
| 2008/0207395 A1 * | 8/2008 | Tanaka | .................... | F16H 59/24 477/121 |
| 2010/0071658 A1 * | 3/2010 | Soejima | ................ | F01N 13/011 123/406.19 |
| 2014/0338327 A1 * | 11/2014 | Borean | .................... | F01L 9/025 60/602 |
| 2015/0113979 A1 * | 4/2015 | Surnilla | .................. | F02B 29/04 60/599 |
| 2015/0337790 A1 * | 11/2015 | Schuele | .................. | F02D 41/22 123/406.43 |
| 2015/0353092 A1 * | 12/2015 | Hotta | ................ | B60W 30/1882 701/54 |
| 2015/0361906 A1 | 12/2015 | Nagai et al. | | |
| 2016/0061317 A1 * | 3/2016 | Nagai | .................... | F16H 59/32 477/115 |

FOREIGN PATENT DOCUMENTS

| | | |
|---|---|---|
| JP | 07-217472 | 8/1995 |
| JP | 2002-331857 A | 11/2002 |
| JP | 2006-300253 A | 11/2006 |
| JP | 2008-121511 A | 5/2008 |
| JP | 2008-121539 A | 5/2008 |
| JP | 2008-157104 | 7/2008 |
| JP | 2009-144575 A | 7/2009 |
| WO | WO 2014/020685 A1 | 2/2014 |

OTHER PUBLICATIONS

Office Action mailed Oct. 5, 2016, in co-pending U.S. Appl. No. 14/831,242.

* cited by examiner

CONTROL APPARATUS FOR VEHICLE

INCORPORATION BY REFERENCE

The disclosure of Japanese Patent Application No. 2014-124803, filed on Jun. 17, 2014 including the specification, drawings and abstract, is incorporated herein by reference in its entirety.

BACKGROUND OF THE INVENTION

1. Field of the Invention

The invention relates to a control apparatus for a vehicle.

2. Description of Related Art

An internal combustion engine capable of switching between combustion modes is available in the related art. For example, Japanese Patent Application Publication No. 2008-157104 (JP 2008-157104 A) discloses a technique for an internal combustion engine in which a turbocharger capable of compressing intake air and supplying the compressed intake air to a combustion chamber is provided so that a combustion mode can be switched by an electronic control unit (ECU) from a non-turbocharging stoichiometric combustion mode to a turbocharging lean combustion mode in accordance with an operating condition of an engine.

SUMMARY OF THE INVENTION

Here, depending on the combustion mode, a torque delay may occur during a downshift, leading to an increase in a shift time. For example, a required intake air amount is larger in a lean combustion mode than in a stoichiometric combustion mode or a rich combustion mode, and therefore an intake air amount deficiency is likely to occur. Further, in a turbocharging operation mode in which turbocharging is executed by the turbocharger, an intake air amount deficiency is likely to occur due to a turbocharging delay. Therefore, when the engine is operated in the turbocharging lean combustion mode during a downshift, the shift time is likely to increase due to a torque delay.

The invention provides a control apparatus for a vehicle, which is capable of suppressing a torque delay during a downshift.

A control apparatus for a vehicle according to an aspect of the invention, wherein the vehicle includes an engine having a turbocharger and an automatic transmission, includes at least one electronic control unit configured to: a) control an air-fuel ratio of the engine and an operating state of the turbocharger based on a parameter indicating a load of the engine; b) control the turbocharger to perform turbocharging and operate the engine in a turbocharging lean combustion mode when the parameter is within a predetermined range, an air-fuel ratio set in the turbocharging lean combustion mode being a predetermined lean air-fuel ratio; and c) operate the engine in a predetermined operation mode instead of the turbocharging lean combustion mode in at least a part of the predetermined range when a downshift is performed in the automatic transmission, an air-fuel ratio set in the predetermined operation mode being a richer air-fuel ratio than the predetermined lean air-fuel ratio.

The electronic control unit may be configured to operate the engine such that the air-fuel ratio set in the predetermined operation mode is a stoichiometric air-fuel ratio.

The electronic control unit may be configured to stop turbocharging performed by the turbocharger in the predetermined operation mode.

With the control apparatus for a vehicle according to this aspect of the invention, a required intake air amount is suppressed by executing the predetermined operation mode instead of the turbocharging lean combustion mode during a downshift, and as a result, a torque delay occurring during the downshift is suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A vehicle control apparatus according to an embodiment of the invention will be described in detail below with reference to the drawings. Note that the invention is not limited to this embodiment. Further, constituent elements of the following embodiment include substantially identical elements or elements that could be envisaged easily by persons skilled in the art.

[Embodiment]

Figure 1:
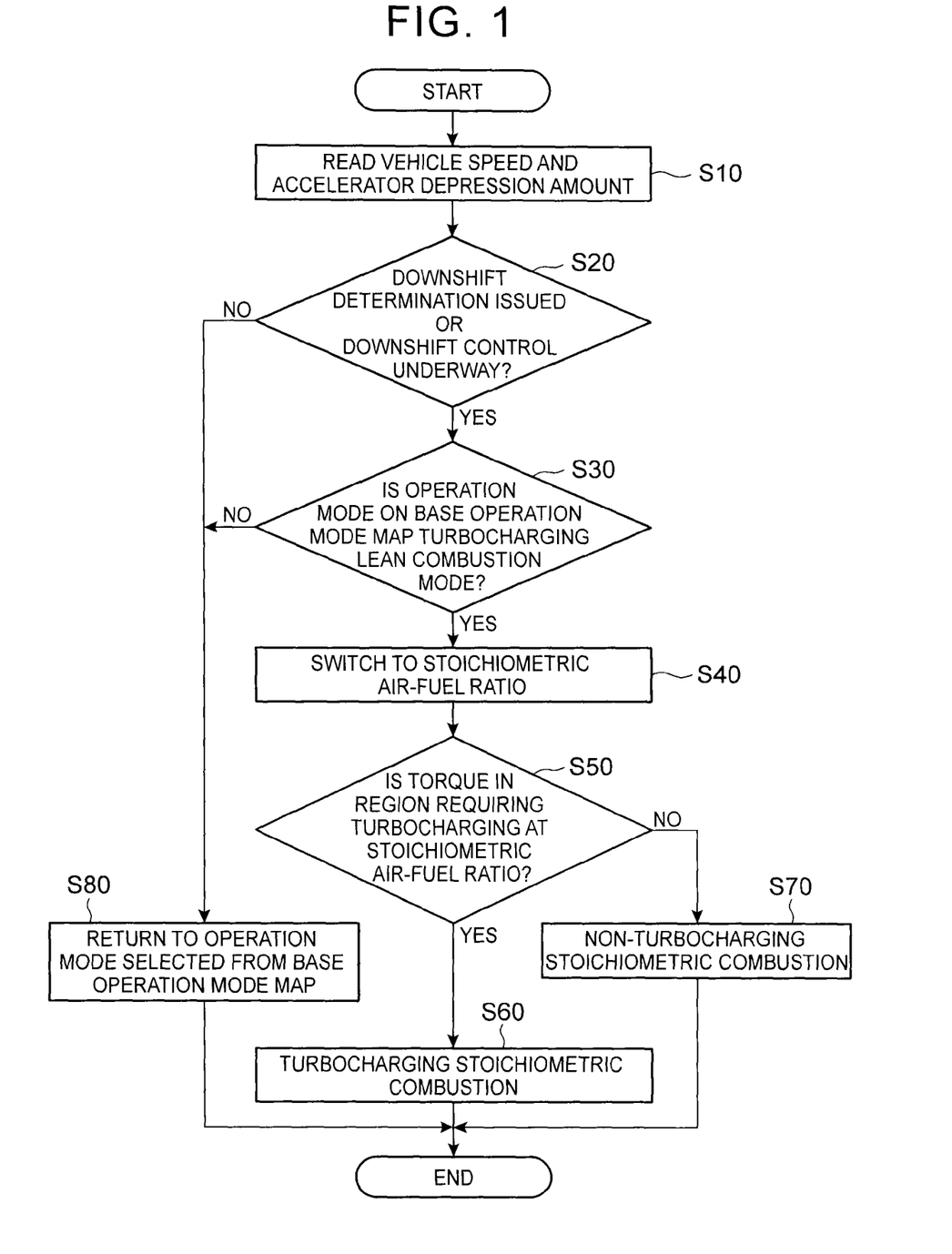
FIG. 1 is a flowchart showing an operation of a vehicle control apparatus according to an embodiment.
Figure 2:
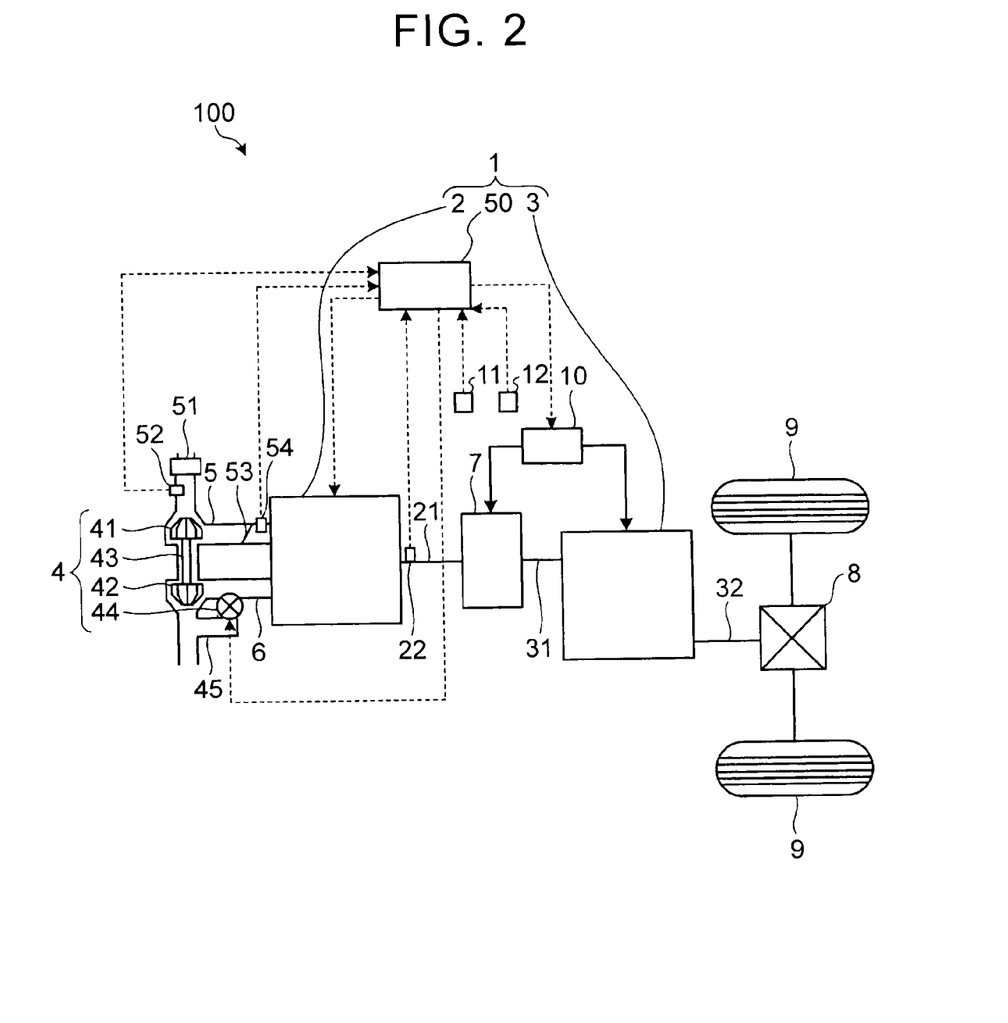
FIG. 2 is a schematic view showing a configuration of a vehicle according to this embodiment.
Figure 3:
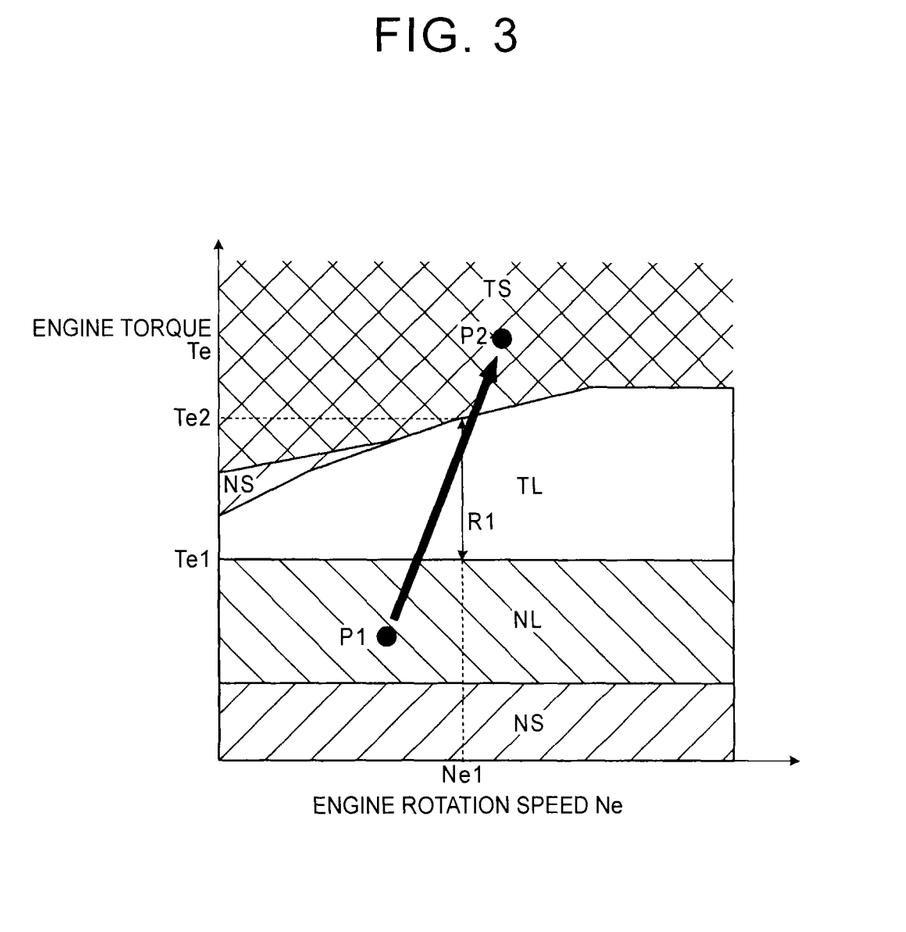
FIG. 3 is a view showing a base operation mode map according to this embodiment.
Figure 4:
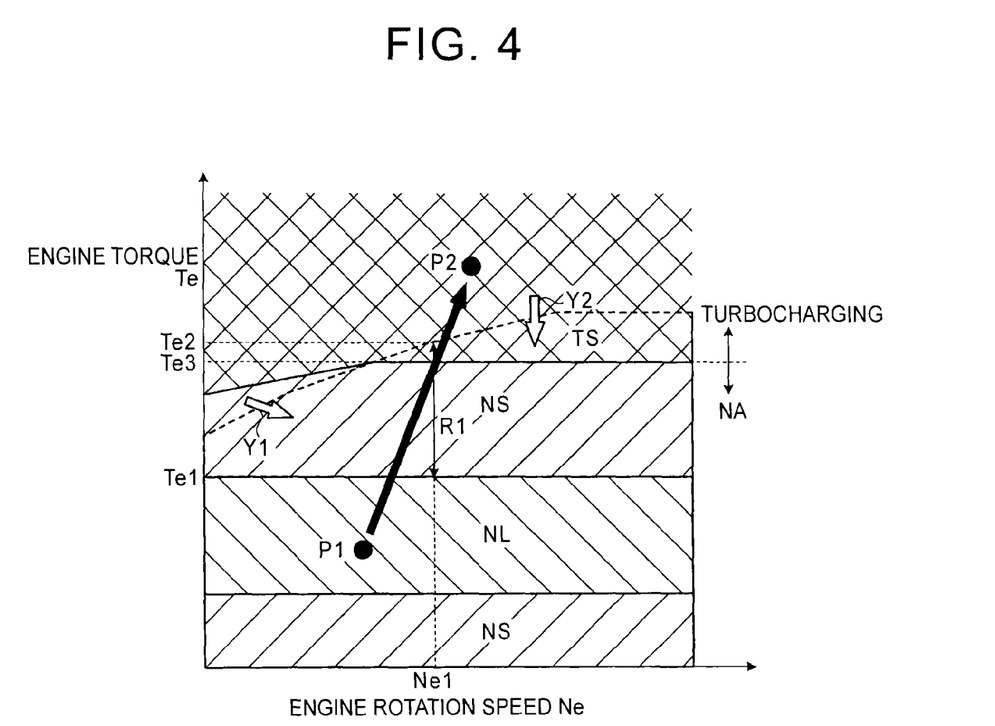
FIG. 4 is a view showing a downshift operation mode map according to this embodiment.
Figure 5:
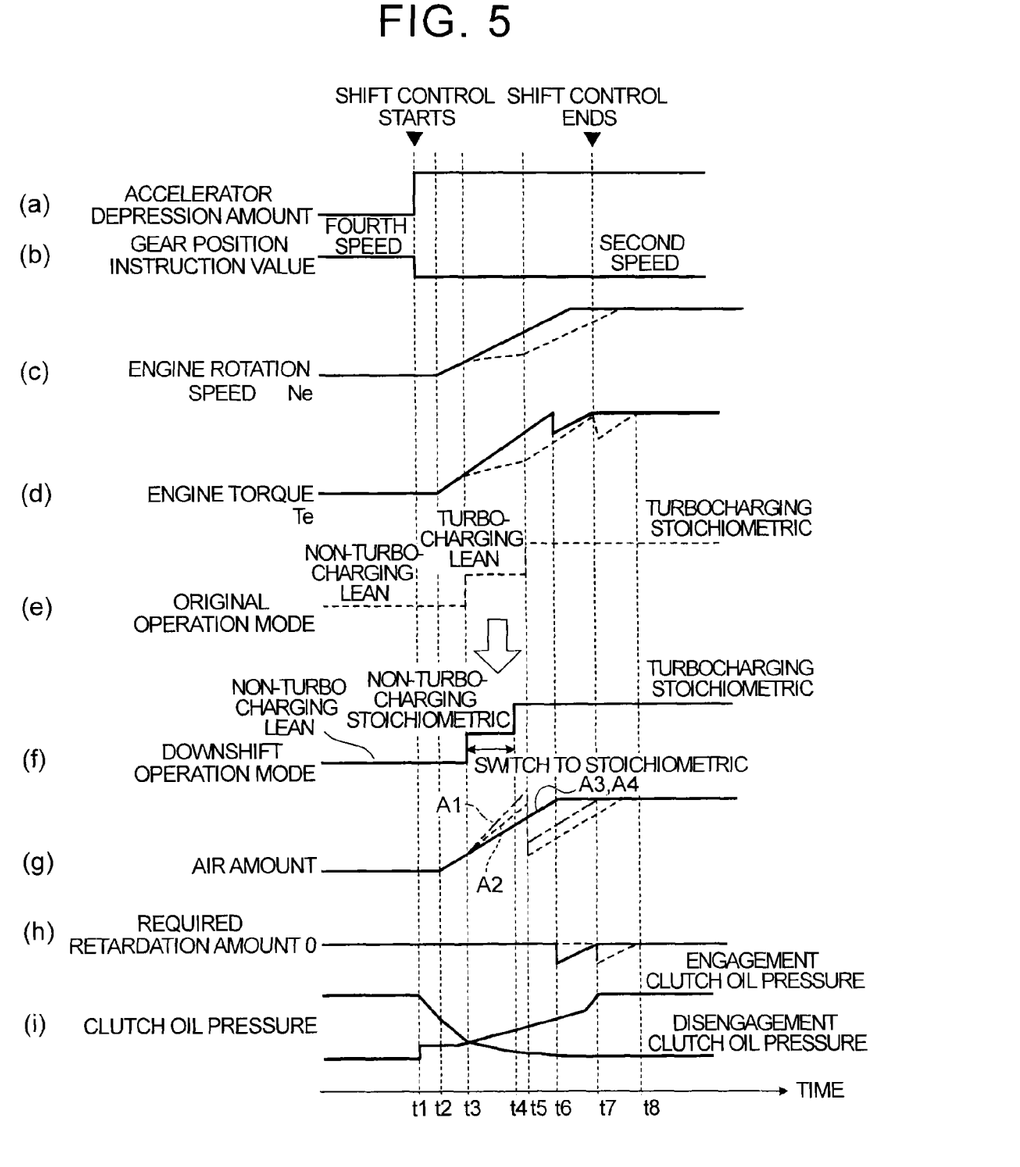
FIG. 5 is a time chart pertaining to vehicle control according to this embodiment.

Referring to FIGS. 1 to 5, an embodiment will be described. This embodiment related to a vehicle control apparatus. FIG. 1 is a flowchart showing an operation of the vehicle control apparatus according to this embodiment of the invention. FIG. 2 is a schematic view showing a configuration of a vehicle according to this embodiment. FIG. 3 is a view showing a base operation mode map according to this embodiment. FIG. 4 is a view showing a downshift operation mode map according to this embodiment. FIG. 5 is a time chart pertaining to vehicle control according to this embodiment.

As shown in FIG. 2, a vehicle 100 according to this embodiment is configured to include a vehicle control apparatus 1. The vehicle control apparatus 1 is configured to include an engine 2, an automatic transmission 3, and a control unit (an ECU) 50. The engine 2 converts combustion energy of fuel burned in a cylinder into rotational energy of a crankshaft 21, and outputs the converted energy. The engine 2 includes a turbocharger 4. The turbocharger 4 is configured to include a compressor 41, a turbine 42, a connecting shaft 43, and a wastegate valve 44. The invention may be implemented using two or more ECUs.

The compressor 41 is disposed in an intake pipe 5 of the engine 2. Air taken into the intake pipe 5 via an air cleaner 51 is sent to respective cylinders of the engine 2 via the compressor 41. An air flow meter 52 that detects a flow rate of the air is disposed in the intake pipe 5 on an upstream side of the compressor 41. A signal indicating a detection result of the air flow meter 52 is output to the control unit 50. A throttle valve 53 and a pressure sensor 54 are disposed in the intake pipe 5 on a downstream side of the compressor 41. The throttle valve 53 controls an intake air amount in each cylinder of the engine 2. The pressure sensor 54 detects an internal pressure of the intake pipe 5. A signal indicating a detection result of the pressure sensor 54 is output to the control unit 50.

The turbine 42 is disposed in an exhaust pipe 6 of the engine 2. Exhaust gas generated in the respective cylinders of the engine 2 is discharged through the exhaust pipe 6. The connecting shaft 43 connects the compressor 41 to the turbine 42. The wastegate valve 44 is disposed in a bypass passage 45. The bypass passage 45 is an exhaust passage that bypasses the turbine 42. The wastegate valve 44 is a control valve that is switched between a fully open condition and a fully closed condition. The wastegate valve 44 is configured to include an actuator. The actuator switches the wastegate valve 44 between the fully open condition and the fully closed condition.

When the wastegate valve 44 is closed, the exhaust gas discharged into the exhaust pipe 6 from the respective cylinders of the engine 2 flows through the turbine 42. Energy from the exhaust gas causes the turbine 42 and the compressor 41 to rotate. The compressor 41, when driven to rotate, compresses and pressurizes the air taken into the intake pipe 5 via the air cleaner 51, and sends the compressed and pressurized air toward the respective cylinders of the engine 2. In other words, when the wastegate valve 44 is closed, the turbocharger 4 executes turbocharging, whereby air having a higher pressure than intake air in a natural state is supplied to the respective cylinders.

When the wastegate valve 44 is open, on the other hand, the exhaust gas is allowed to flow from the exhaust pipe 6 into the bypass passage 45. As a result, the exhaust gas discharged from the respective cylinders of the engine 2 is discharged through the bypass passage 45 so as to bypass the turbine 42. Hence, when the wastegate valve 44 is open, a non-turbocharging condition in which the turbocharger 4 does not execute turbocharging is established. The wastegate valve 44 is opened and closed in response to commands from the control unit 50.

The crankshaft 21 of the engine 2 is connected to an input shaft 31 of the automatic transmission 3 via a torque converter 7. A crank position sensor 22 detects a rotation position of the crankshaft 21. A signal indicating a detection result of the crank position sensor 22 is output to the control unit 50. The automatic transmission 3 according to this embodiment is stepped. The automatic transmission 3 varies a gear ratio in multiple stages by switching a plurality of engagement devices between engaged and disengaged conditions. The engagement devices are constituted by a clutch that connects rotary elements to each other and a brake that restricts rotation of the rotary elements, for example. The engagement devices are engaged using oil pressure, for example. The vehicle control apparatus 1 includes an oil pressure control apparatus 10 that controls oil pressures supplied to the torque converter 7 and the automatic transmission 3. The oil pressure control apparatus 10 regulates an oil pressure supplied to a lockup clutch of the torque converter 7 and oil pressures supplied to the respective engagement devices of the automatic transmission 3. The oil pressure control apparatus 10 is controlled by the control unit 50. An output shaft 32 of the automatic transmission 3 is connected to left and right drive wheels 9 via a differential gear 8.

The control unit 50 has functions for controlling respective parts of the vehicle 100. The control unit 50 according to this embodiment is an electronic control unit that includes a computer. The control unit 50 includes an engine control unit that controls the engine 2 and a shift control unit that controls the automatic transmission 3. The control unit 50 controls an air-fuel ratio of the engine 2 and an operating condition of the turbocharger 4 on the basis of parameters indicating a load of the engine 2. The parameters indicating the load of the engine 2 according to this embodiment are an engine rotation speed Ne and an engine torque Te. The control unit 50 is connected to an accelerator depression amount sensor 11, and obtains a signal indicating an accelerator depression amount from the accelerator depression amount sensor 11. Further, the control unit 50 is connected to a vehicle speed sensor 12, and obtains a vehicle speed of the vehicle 100 from the vehicle speed sensor 12. The control unit 50 calculates a required acceleration of a driver on the basis of the vehicle speed and the accelerator depression amount. The control unit 50 then determines a target output torque and a target rotation speed of the engine 2 on the basis of the required acceleration, the vehicle speed, and the gear ratio of the automatic transmission 3.

The control unit 50 outputs command values relating to intake air control, fuel injection control, ignition control, and so on to the engine 2 so as to realize the determined target output torque and target rotation speed. Further, the control unit 50 determines the air-fuel ratio of the engine 2 and the operating condition of the turbocharger 4 on the basis of an operating point of the engine 2. The control unit 50 according to this embodiment determines the air-fuel ratio of the engine 2 and the operating condition of the turbocharger 4 on the basis of the operation mode map shown in FIG. 3. The engine 2 includes three combustion modes having different air-fuel ratios. A stoichiometric combustion mode is a combustion mode in which the air-fuel ratio of the engine 2 is set at a stoichiometric air-fuel ratio. The stoichiometric air-fuel ratio (a theoretical air-fuel ratio) of the engine 2, which uses gasoline as fuel, is 14.7, for example. A lean combustion mode is a combustion mode in which the air-fuel ratio of the engine 2 is set at a predetermined lean air-fuel ratio on a lean side of the stoichiometric air-fuel ratio. The predetermined lean air-fuel ratio of the engine 2, which uses gasoline as fuel, is "15.5 to 25", for example. A rich combustion mode is a combustion mode in which the air-fuel ratio of the engine 2 is set at a predetermined rich air-fuel ratio on a rich side of the stoichiometric air-fuel ratio. The predetermined rich air-fuel ratio of the engine 2, which uses gasoline as fuel, is "10 to 14", for example.

The operation mode of the engine 2 can be divided into two mode types depending on whether or not the turbocharger 4 executes turbocharging. In this specification, an operation mode in which turbocharging by the turbocharger 4 is stopped will be referred to as a non-turbocharging operation mode, and an operation mode in which the turbocharger 4 executes turbocharging will be referred to as a turbocharging operation mode. The non-turbocharging operation mode includes a non-turbocharging lean combustion mode, a non-turbocharging stoichiometric combustion mode, and a non-turbocharging rich combustion mode. The non-turbocharging lean combustion mode is an operation mode in which the lean combustion mode is set as the combustion mode of the engine 2 and turbocharging by the turbocharger 4 is stopped. The non-turbocharging stoichiometric combustion mode is an operation mode in which the stoichiometric combustion mode is set as the combustion mode of the engine 2 and turbocharging by the turbocharger 4 is stopped. The non-turbocharging rich combustion mode is an operation mode in which the rich combustion mode is set as the combustion mode of the engine 2 and turbocharging by the turbocharger 4 is stopped.

The turbocharging operation mode includes a turbocharging lean combustion mode, a turbocharging stoichiometric combustion mode, and a turbocharging rich combustion mode. The turbocharging lean combustion mode is an operation mode in which the lean combustion mode is set as the combustion mode of the engine 2 and turbocharging is executed by the turbocharger 4. The turbocharging stoichiometric combustion mode is an operation mode in which the stoichiometric combustion mode is set as the combustion mode of the engine 2 and turbocharging is executed by the turbocharger 4. The turbocharging rich combustion mode is an operation mode in which the rich combustion mode is set as the combustion mode of the engine 2 and turbocharging is executed by the turbocharger 4.

In FIG. 3, the abscissa shows the engine rotation speed Ne and the ordinate shows the engine torque Te. FIG. 3 shows a correspondence relationship between the engine operating point, which is a combination of the engine rotation speed Ne and the engine torque Te, and the operation mode of the engine 2 selected at the corresponding operating point. A non-turbocharging stoichiometric region NS is a region of an operating point at which the non-turbocharging stoichiometric combustion mode is selected. As shown in FIG. 3, the non-turbocharging stoichiometric region NS corresponds to a region of the map having the lowest torque. A non-turbocharging lean region NL is a region of an operating point at which the non-turbocharging lean combustion mode is selected. The non-turbocharging lean region NL is a region adjacent to the non-turbocharging stoichiometric region NS and on a high torque side of the non-turbocharging stoichiometric region NS.

A turbocharging lean region TL is a region of an operating point at which the turbocharging lean combustion mode is selected. The turbocharging lean region TL is a region adjacent to the non-turbocharging lean region NL and on the high torque side of the non-turbocharging lean region NL. A turbocharging stoichiometric region TS is a region of an operating point at which the turbocharging stoichiometric combustion mode is selected. The turbocharging stoichiometric region TS is a region adjacent to the turbocharging lean region TL and on the high torque side of the turbocharging lean region TL.

On the basis of the map shown in FIG. 3, the control unit 50 operates the engine 2 in the turbocharging lean combustion mode when the engine torque Te is within a predetermined range R1. Here, the predetermined range R1 is a range of the engine torque Te, which is determined in accordance with the engine rotation speed Ne. For example, when the engine rotation speed Ne is Ne1, as shown in FIG. 3, the predetermined range R1 corresponds to a range of the engine torque Te from a lower limit torque Te1 to an upper limit torque Te2, as shown in FIG. 3. The lower limit torque Te1 is a torque value on a boundary between the non-turbocharging lean region NL and the turbocharging lean region TL. The upper limit torque Te2 is a torque value on a boundary between the turbocharging lean region TL and the turbocharging stoichiometric region TS.

Incidentally, when a downshift is performed by the automatic transmission 3, the engine torque Te and the engine rotation speed Ne must be increased. During the downshift, the operating point of the engine 2 varies from a pre-shift operating point toward a post-shift operating point at which the torque and the rotation speed are relatively high. Here, when the turbocharging lean combustion mode is set in the engine 2 during the downshift, a shift response is likely to decrease. For example, it is assumed that, in response to the downshift, the operating point of the engine 2 varies from a pre-shift operating point P1 to a post-shift operating point P2, as shown in FIG. 3. A locus of the operating point of the engine 2 passes through the turbocharging lean region TL during the downshift. While the operating point passes through the turbocharging lean region IL, the engine 2 is operated in the turbocharging lean combustion mode.

In the turbocharging lean combustion mode, a predetermined time required to reach the required intake air amount is longer than in the other combustion modes for following reasons (1) to (3), and as a result, the engine torque Te is more likely to increase at a delay. (1) The required intake air amount is larger during lean combustion than during stoichiometric combustion or rich combustion. (2) In the turbocharging operation mode, the predetermined time required to reach the required intake air amount is longer than in the non-turbocharging operation mode due to a turbocharging delay. (3) During lean combustion, less exhaust gas energy is generated than during stoichiometric combustion and rich combustion, and therefore the turbocharging delay increases.

Hence, when the engine 2 is operated in the turbocharging lean combustion mode during a downshift, the engine torque Te and the engine rotation speed Ne may increase at a delay, and as a result, the shift time may increase. It is desirable to be able to shorten the shift time.

When a downshift is performed by the automatic transmission 3, the control unit 50 according to this embodiment operates the engine 2 in a predetermined operation mode in which the air-fuel ratio is set on the rich side of the predetermined lean air-fuel ratio instead of the turbocharging lean combustion mode in at least a part of the predetermined range R1. The required intake air amount is smaller in the predetermined operation mode than in the turbocharging lean combustion mode. A torque delay is therefore suppressed such that the engine torque Te increases quickly. Hence, with the vehicle control apparatus 1 according to this embodiment, the shift time of a downshift is shortened.

As will be described below with reference to FIG. 4, the control unit 50 according to this embodiment sets the air-fuel ratio of the engine 2 at the stoichiometric air-fuel ratio instead of the predetermined lean air-fuel ratio in the predetermined range R1. In other words, the predetermined operation mode according to this embodiment is an operation mode in which the stoichiometric air-fuel ratio is set as the air-fuel ratio of the engine 2. As a result, the required intake air amount can be reduced sufficiently in comparison with a case where the engine 2 is operated at the predetermined lean air-fuel ratio.

FIG. 4 is an operation mode map showing the operation modes of the engine 2 executed during a downshift. In the following description, the operation mode map shown in FIG. 3 will be referred to as a "base operation mode map", and the operation mode map shown in FIG. 4 will be referred to as a "downshift operation mode map". When a downshift is not underway, the control unit 50 determines the combustion mode of the engine 2 on the basis of the base operation mode map. During a downshift, the control unit 50 executes the predetermined operation mode in which the air-fuel ratio is enriched instead of the turbocharging lean combustion mode when the operation mode determined from the base operation mode map is the turbocharging lean combustion mode. Hence, when the actually executed operation modes are plotted on a map, the downshift operation mode map shown in FIG. 4 is obtained.

On the downshift operation mode map, the region serving as the turbocharging lean region TL on the base operation mode map is replaced by the non-turbocharging stoichiometric region NS and the turbocharging stoichiometric region TS. In other words, the turbocharging lean region TL is smaller during a downshift than when a downshift is not underway, and as a result, a torque range (referred to simply as a "turbocharging lean range" hereafter) in which the turbocharging lean combustion mode is executed decreases. On the downshift operation mode map shown in FIG. 4, the turbocharging lean region TL is reduced to a maximum extent in comparison with the base operation mode map such that the turbocharging lean region TL is eliminated. In other words, the turbocharging lean range is reduced to a maximum extent so as to form a torque range having a width of zero.

As shown by an arrow Y1, in accordance with the reduction of the turbocharging lean region TL, the non-turbocharging stoichiometric region NS is enlarged in comparison with the base operation mode map. The non-turbocharging stoichiometric region NS on the base operation mode map is enlarged toward the region serving as the turbocharging lean region TL on the base operation mode map. As a result, a torque range in which the non-turbocharging stoichiometric combustion mode is executed increases toward a low torque side of the engine torque Te and a high rotation side of the engine rotation speed Ne. Further, as shown by an arrow Y2, the turbocharging stoichiometric region TS is enlarged in comparison with the base operation mode map. The turbocharging stoichiometric region TS on the base operation mode map is enlarged toward the region serving as the turbocharging lean region TL on the base operation mode map. As a result, a torque range in which the turbocharging stoichiometric combustion mode is executed increases toward the low torque side.

According to the downshift operation mode map, in the predetermined range R1 in which the turbocharging lean combustion mode is executed in accordance with the base operation mode map, the non-turbocharging stoichiometric combustion mode or the turbocharging stoichiometric combustion mode is executed instead of the turbocharging lean combustion mode. The non-turbocharging stoichiometric combustion mode is executed on the low torque side of the predetermined range R1, and the turbocharging stoichiometric combustion mode is executed on the high torque side.

In the stoichiometric combustion mode, the required intake air amount is smaller than in the lean combustion mode, and therefore a torque delay is less likely to occur. Furthermore, in the non-turbocharging operation mode, a turbocharging delay does not occur, and therefore a torque delay is less likely to occur than in the turbocharging operation mode. Hence, by operating the engine 2 on the basis of the downshift operation mode map during a downshift, a torque delay can be suppressed, and as a result, the shift time can be shortened.

Referring to FIGS. 1 and 5, an operation of the vehicle control apparatus 1 according to this embodiment will be described. FIG. 5 shows (a) the accelerator depression amount, (b) a gear position instruction value, (c) the engine rotation speed Ne, (d) the engine torque Te, (e) an original operation mode, (f) a downshift operation mode, (g) the air amount, (h) a required retardation amount, and (i) a clutch oil pressure. The original operation mode is the operation mode of the engine 2 selected on the basis of the base operation mode map shown in FIG. 3. The downshift operation mode is the combustion mode determined in accordance with the downshift operation mode map shown in FIG. 4. In the sections (c), (d), (e), (g), and (h), dotted lines indicate transitions of respective values obtained when the engine 2 is operated in the original operation mode. A control flow shown in FIG. 1 is executed repeatedly at predetermined intervals during travel, for example.

In step S10, the control unit 50 reads the vehicle speed and the accelerator depression amount. The control unit 50 reads the vehicle speed and the accelerator depression amount from the vehicle speed sensor 12 and the accelerator depression amount sensor 11, respectively. After step S10 is executed, the control advances to step S20.

In step S20, the control unit 50 determines whether or not a downshift determination has been issued or downshift control is underway. In other words, in step S20, a determination is made as to whether or not a downshift is underway. An affirmative determination is made in step S20 when, for example, a downshift execution request is issued to the automatic transmission 3 on the basis of the accelerator depression amount or a shift operation performed by the driver. An affirmative determination is also made in step S20 when downshift control is currently being executed on the automatic transmission 3. In FIG. 5, the accelerator depression amount increases at a time t1 such that the gear position instruction value varies from a fourth speed gear position to a second speed gear position. Accordingly, a downshift determination is issued, and as a result, an affirmative determination (a determination that a downshift is underway) is made in step S20. An affirmative determination continues to be made in step S20 after the downshift control on the automatic transmission 3 is actually started in response to the downshift determination until the downshift control is completed.

The downshift control includes engine control and control of the oil pressure (the clutch oil pressure) supplied to the respective engagement devices of the automatic transmission 3. When it is determined as a result of the determination of step S20 that the downshift determination has been issued or the downshift control is underway (step S20-Y), the control advances to step S30, and in all other cases (step S20-N), the control advances to S80.

In step S30, the control unit 50 determines whether or not the operation mode according to the base operation mode map is the turbocharging lean combustion mode. The control unit 50 determines whether or not the operation mode corresponding to the current operating point of the engine 2 (the engine rotation speed Ne and the engine torque Te) is the turbocharging lean combustion mode by referring to the base operation mode map. When the current operating point of the engine 2 is an operating point within the turbocharging lean region TL on the base operation mode map, an affirmative determination is made in step S30. When it is determined as a result of the determination of step S30 that combustion according to the base operation mode map corresponds to the turbocharging lean combustion mode (step S30-Y), the control advances to step S40, and in all other cases (step S30-N), the control advances to S80. In FIG. 5, the original combustion mode switches from the non-turbocharging lean combustion mode to the turbocharging lean combustion mode at a time t3, whereby an affirmative determination is made in step S30.

In step S40, the control unit 50 modifies the combustion mode from the lean combustion mode to the stoichiometric combustion mode. According to this embodiment, when the operation mode according to the base operation mode map is the turbocharging lean combustion mode, the control unit 50 modifies the air-fuel ratio of the engine 2 to an air-fuel ratio (in this embodiment, the stoichiometric air-fuel ratio) on the rich side of the predetermined lean air-fuel ratio. In FIG. 5, the lean combustion mode is modified to the stoichiometric combustion mode between the time t3 and a time t4. After step S40 is executed, the control advances to step S50.

In step S50, the control unit 50 determines whether or not the engine torque Te is in a torque region in which turbocharging is required while the stoichiometric air-fuel ratio is set. The control unit 50 determines whether or not the current engine torque Te equals or exceeds a lower limit torque Te3 (see FIG. 4) of the turbocharging stoichiometric region TS. In other words, the control unit 50 determines whether or not the current operating point of the engine 2 is within the turbocharging stoichiometric region TS. When it is determined as a result of the determination of step S50 that the engine torque Te is in a torque region in which turbocharging is required while the stoichiometric air-fuel ratio is set (step S50-Y), the control advances to step S60, and in all other cases (step S50-N), the control advances to S70. Note that the lower limit torque Te3 may be either a fixed value that is not dependent on the engine rotation speed Ne or a value that varies in accordance with the engine rotation speed Ne.

In step S60, the control unit 50 sets the turbocharging stoichiometric combustion mode as the combustion mode of the engine 2. The control unit 50 sets the air-fuel ratio of the engine 2 at the stoichiometric air-fuel ratio. Further, the control unit 50 closes the wastegate valve 44 such that the turbocharging operation mode in which the turbocharger 4 executes turbocharging is set as the operation mode of the engine 2. After step S60 is executed, the current control flow is terminated.

In step S70, the control unit 50 sets the non-turbocharging stoichiometric combustion mode as the combustion mode of the engine 2. The control unit 50 sets the air-fuel ratio of the engine 2 at the stoichiometric air-fuel ratio. Further, the control unit 50 opens the wastegate valve 44 such that the non-turbocharging operation mode in which turbocharging by the turbocharger 4 is stopped is set as the operation mode of the engine 2. After step S70 is executed, the current control flow is terminated.

In step S80, the control unit 50 returns the operation mode of the engine 2 to the operation mode selected from the base operation mode map. The control unit 50 sets the operation mode determined from the base operation mode map and the current operating point of the engine 2 as the operation mode of the engine 2. After step S80 is executed, the current control flow is terminated.

A specific example of an operation performed during a downshift will now be described with reference to FIG. 5. In FIG. 5, the accelerator depression amount increases at the time t1 such that the gear position instruction value varies from the fourth speed gear position to the second speed gear position, and as a result, the downshift control is started. The pre-shift operating point of the engine 2 is the pre-shift operating point P1 shown in FIGS. 3 and 4, for example, and the operating point of the engine 2 after shifting to the second speed gear position is the post-shift operating point P2 shown in FIGS. 3 and 4, for example. The operation mode of the engine 2 at the start of the downshift control is the non-turbocharging lean combustion mode.

An opening of the throttle valve 53 increases in response to the increase in the accelerator depression amount, whereby the intake air amount of the engine 2 starts to increase at a time t2. Further, the engine torque Te starts to increase in response to the increase in the intake air amount, whereby the engine rotation speed Ne also starts to increase. In response to the increase in the engine torque Te, the original operation mode switches from the non-turbocharging lean combustion mode to the turbocharging lean combustion mode at the time t3. When, hypothetically, the operation mode of the engine 2 is switched to the turbocharging lean combustion mode at the time t3, an actual intake air amount A2 is insufficient relative to a required intake air amount A1, indicated by a dot-dash line in the air amount section (g). This deficiency is due to the large required intake air amount A1, the turbocharging delay, and so on in the lean combustion mode. As a result, a torque delay occurs in the engine torque Te (dotted line) such that the engine rotation speed Ne (dotted line) likewise increases at a delay.

At a time t5, the original operation mode switches from the turbocharging lean combustion mode to the turbocharging stoichiometric combustion mode. The torque delay caused by the turbocharging delay and so on continues to occur even after the operation mode switch, and therefore the actual intake air amount A2 remains insufficient relative to the required intake air amount A1. When a downshift is executed in the original operation mode, the downshift is completed at a time t8.

In the downshift control performed by the control unit 50 according to this embodiment, on the other hand, the operation mode of the engine 2 is set at the non-turbocharging stoichiometric combustion mode instead of the turbocharging lean combustion mode at the time t3. A required intake air amount A3 of the non-turbocharging stoichiometric combustion mode is smaller than the required intake air amount A1 of the turbocharging lean combustion mode. Moreover, in the non-turbocharging stoichiometric combustion mode, a turbocharging delay does not occur. Hence, in the non-turbocharging stoichiometric combustion mode, an actual intake air amount A4 increases in accordance with the required intake air amount A3 such that a torque delay is suppressed. When a downshift is executed in the downshift operation mode, the operation mode switches to the turbocharging stoichiometric combustion mode at the time t4. When the engine 2 is operated in the stoichiometric combustion mode, a larger amount of exhaust gas energy is generated than in the lean combustion mode, and as a result, the turbocharging delay is suppressed.

At a time t6, the control unit 50 starts to perform torque reduction control by means of ignition retardation. Ignition retardation is control for reducing the engine torque Te by retarding an ignition timing of the engine 2. As a result of the torque reduction control by means of ignition retardation, the engine rotation speed Ne is synchronized with a post-downshift target rotation speed. When a downshift is executed in the downshift operation mode, the downshift is completed at a time t7, which is earlier than the completion time (the time t8) when a downshift is executed in the original operation mode.

With the vehicle control apparatus 1 according to this embodiment, as described above, when a downshift is performed by the automatic transmission 3, the control unit 50 operates the engine 2 in a predetermined operation mode instead of the turbocharging lean combustion mode in at least a part of the predetermined range R1 (in the entire predetermined range R1 in the example shown in FIG. 4). In this embodiment, the predetermined operation mode is the non-turbocharging stoichiometric combustion mode or the turbocharging stoichiometric combustion mode. When the air-fuel ratio is set at the stoichiometric air-fuel ratio, a torque delay is suppressed in comparison with a case where the air-fuel ratio is set at the predetermined lean air-fuel ratio. Further, the non-turbocharging stoichiometric combustion mode, which is a non-turbocharging operation mode, is executed in a low torque side region of the predetermined range R1, and as a result, a torque delay caused by a turbocharging delay in a low torque region is suppressed. By including the non-turbocharging operation mode in the predetermined operation mode executed within the predetermined range R1 in this manner, a torque delay caused by a turbocharging delay is suppressed.

Furthermore, the vehicle control apparatus 1 according to this embodiment modifies only the turbocharging lean combustion mode, in which a torque delay is considered most likely to occur, to the predetermined operation mode. The non-turbocharging lean combustion mode is executed as is without being modified to the predetermined operation mode. As a result, an increase in fuel consumption due to enrichment of the air-fuel ratio can be minimized. In other words, the vehicle control apparatus 1 according to this embodiment is capable of both increasing the shift response and suppressing an increase in fuel consumption.

[First Modified Example of Embodiment]

The vehicle control apparatus 1 according to the embodiment described above selects the original operation mode on the basis of the base operation mode map, and modifies the original operation mode to the predetermined operation mode when the original operation mode is the turbocharging lean combustion mode while a downshift is underway. Instead, the vehicle control apparatus 1 may include two maps, namely the base operation mode map and the downshift operation mode map.

In this case, the control unit 50 may determine the operating point of the engine 2 on the basis of the base operation mode map when a downshift is not underway, and determine the operating point of the engine 2 on the basis of the downshift operation mode map instead of the base operation mode map when a downshift is underway.

[Second Modified Example of Embodiment]

Figure 6:
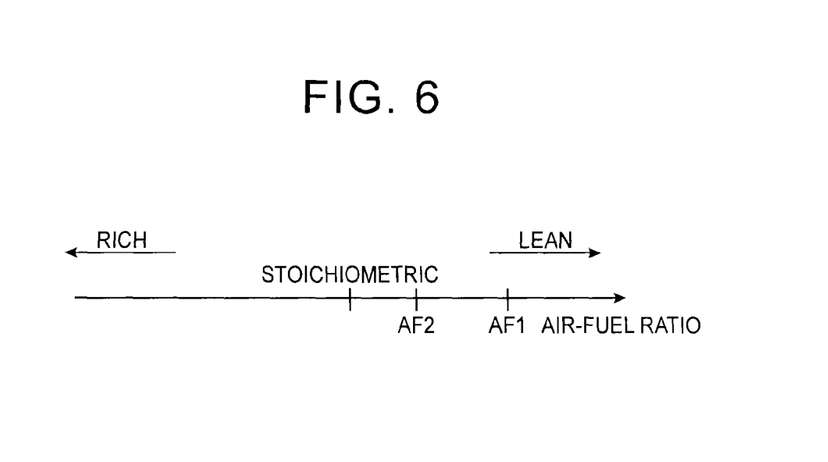
FIG. 6 is a view illustrating an air-fuel ratio of a predetermined operation mode according to a second modified example of this embodiment.

A second modified example of the embodiment will now be described. FIG. 6 is a view illustrating the air-fuel ratio of the predetermined operation mode according to the second modified example of this embodiment. The combustion mode following the modification of step S40 in a case where the operation mode based on the base operation mode map is the turbocharging lean combustion mode (step S30-Y) is not limited to the stoichiometric combustion mode. The modified combustion mode may also be an enriched combustion mode. Here, the enriched combustion mode is a combustion mode in which the air-fuel ratio of the engine 2 is set at an air-fuel ratio on the lean side of the stoichiometric air-fuel ratio and on the rich side of the predetermined lean air-fuel ratio. As shown in FIG. 6, for example, an air-fuel ratio AF2 of the engine 2 in the enriched combustion mode is set at an air-fuel ratio between a predetermined lean air-fuel ratio AF1 and the stoichiometric air-fuel ratio. When the predetermined lean air-fuel ratio AF1 is an air-fuel ratio range having a certain width, the air-fuel ratio AF2 of the enriched combustion mode may be set at an air-fuel ratio between a lower limit air-fuel ratio (an air-fuel ratio furthest toward the rich side) of the predetermined lean air-fuel ratio AF1 and the stoichiometric air-fuel ratio.

The modified combustion mode may also be a rich combustion mode, for example. More specifically, at an operating point within the turbocharging lean region TL on the base operation mode map, the engine 2 may be operated in the non-turbocharging rich combustion mode and the turbocharging rich combustion mode during a downshift.

The air-fuel ratio of the predetermined operation mode may be determined on the basis of a magnitude of a required torque, for example. For example, the air-fuel ratio of the predetermined operation mode may be determined on the basis of a magnitude of a torque difference between the current engine torque Te and a required engine torque based on the accelerator depression amount. In accordance with the torque difference, the combustion mode of the predetermined operation mode may be set at the enriched combustion mode (a small torque difference), the stoichiometric combustion mode (a medium torque difference), and the rich combustion mode (a large torque difference).

[Third Modified Example of Embodiment]

Figure 7:
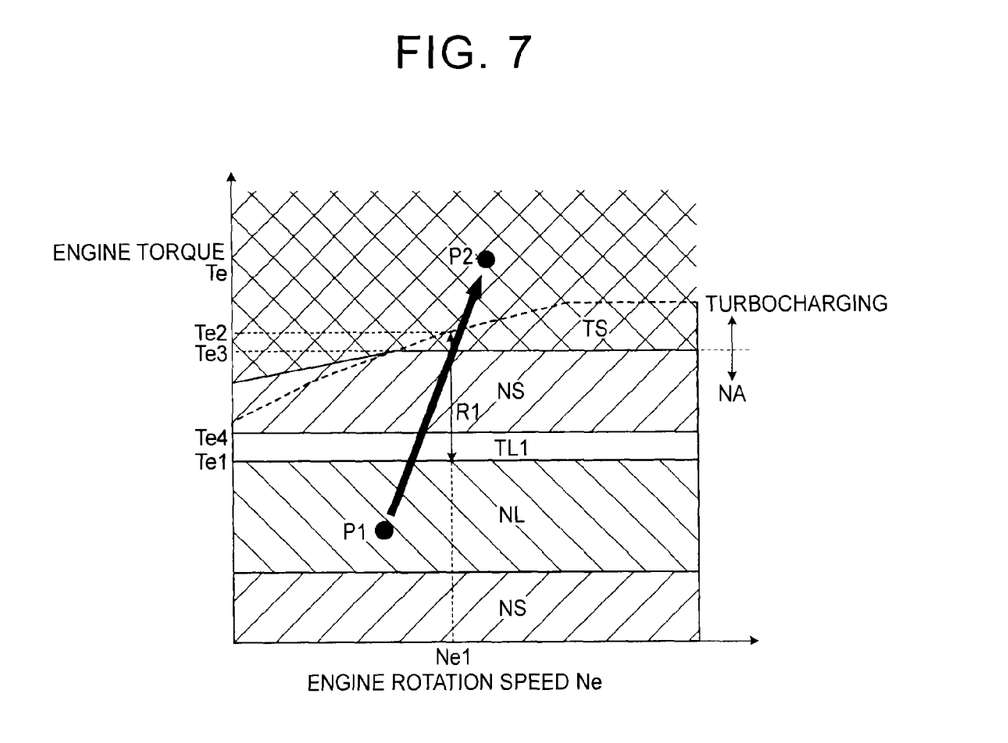
FIG. 7 is a view showing the downshift operation mode map according to a third modified example of this embodiment.

A third modified example of the embodiment will now be described. FIG. 7 is a view showing the downshift operation mode map according to the third modified example of this embodiment. On the downshift operation mode map (see FIG. 4) according to the above embodiment, the entire turbocharging lean region TL of the base operation mode map (see FIG. 3) is replaced by the non-turbocharging stoichiometric region NS or the turbocharging stoichiometric region TS. On the downshift operation mode map according to the third modified example, on the other hand, a part of the turbocharging lean region TL of the base operation mode map is replaced by the non-turbocharging stoichiometric region NS or the turbocharging stoichiometric region TS, while the rest of the region remains as the turbocharging lean region TL.

As shown in FIG. 7, the downshift operation mode map according to the third modified example includes a downshift turbocharging lean region TL1. The downshift turbocharging lean region TL1 is narrower than the turbocharging lean region TL on the base operation mode map. More specifically, the downshift turbocharging lean region TL1 matches a low torque side part of the turbocharging lean region TL. In other words, a lower limit torque Te1 of the downshift turbocharging lean region TL1 is equal to the lower limit torque Te1 of the turbocharging lean region TL. When the engine rotation speed Ne equals Ne1, an upper limit torque Te4 of the downshift turbocharging lean region TL1 takes a value on the low torque side of the upper limit torque Te2 of the turbocharging lean region TL on the base operation mode map.

Hence, with the downshift operation mode map according to the third modified example, the turbocharging lean combustion mode is executed in the low torque side part of the predetermined range R1, and the predetermined operation mode, including the non-turbocharging stoichiometric combustion mode, the turbocharging stoichiometric combustion mode, and so on, is executed in the high torque side part. The downshift turbocharging lean region TL1 is a narrower region than the turbocharging lean region TL on the base operation mode map, and the width thereof in an engine torque axis direction is correspondingly narrow. Likewise with the downshift operation mode map according to the third modified example, therefore, a torque delay can be suppressed during a downshift.

Note that a high torque side part of the turbocharging lean region TL according to the base operation mode map or an intermediate torque region of the turbocharging lean region TL according to the base operation mode map may also be set as the downshift turbocharging lean region TL1.

[Fourth Modified Example of Embodiment]

A fourth modified example of the embodiment will now be described. In the embodiment and the respective modified examples described above, the automatic transmission 3 is not limited to a stepped transmission. The automatic transmission 3 may be a continuously variable transmission, for example. Likewise in a case where the automatic transmission 3 is a continuously variable transmission or the like, a torque delay is likely to occur when the turbocharging lean combustion mode is executed in the engine 2 during a downshift. Therefore, when a downshift is performed in a continuously variable transmission or the like, the torque delay can be suppressed by operating the engine 2 in the predetermined operation mode instead of the turbocharging lean combustion mode in at least a part of the predetermined range R1.

[Fifth Modified Example of Embodiment]

A fifth modified example of the embodiment will now be described. The parameter indicating the load of the engine 2 is not limited to the engine torque Te. The parameter indicating the load of the engine 2 may be the intake air amount, a turbocharging pressure, the accelerator depression amount, the throttle opening, and so on.

[Sixth Modified Example of Embodiment]

A sixth modified example of the embodiment will now be described. The vehicle control performed in the embodiment and the respective modified examples may be applied to a vehicle that executes model-based shift control based on a gear train motion equation. For example, a method of determining the operation mode of the engine 2 disclosed in the embodiment and the respective modified examples described above may be applied to a vehicle installed with a shift control apparatus for a vehicle published in International Patent Application Publication WO2014/020685.

The content disclosed in the embodiments and modified examples described above may be executed in appropriate combinations.

What is claimed is:

1. A control apparatus for a vehicle, comprising:
an engine having a turbocharger;
an automatic transmission; and
a controller configured to control an air-fuel ratio of the engine and an operating state of the turbocharger based on a parameter indicating a load of the engine, wherein
the controller controls the turbocharger to perform turbocharging and operate the engine in a turbocharging lean combustion mode, in which the air-fuel ratio is set to a predetermined lean air-fuel ratio, when the parameter is within a predetermined range, and
the controller operates the engine in a predetermined operation mode, in which the air-fuel ratio is set to a richer air-fuel ratio than the predetermined lean air-fuel ratio, instead of the turbocharging lean combustion mode in at least a part of the predetermined range only when the engine is operated in the turbocharging lean combustion mode during a downshift of the automatic transmission.

2. The control apparatus for the vehicle according to claim 1, wherein the predetermined operation mode is an operation mode in which the air-fuel ratio is set to a stoichiometric air-fuel ratio.

3. The control apparatus for the vehicle according to claim 1, wherein the predetermined operation mode includes a non-turbocharging operation mode in which turbocharging by the turbocharger is stopped.

4. The control apparatus for the vehicle according to claim 2, wherein the predetermined operation mode includes a non-turbocharging operation mode in which turbocharging by the turbocharger is stopped.

* * * * *